Patented Dec. 29, 1931

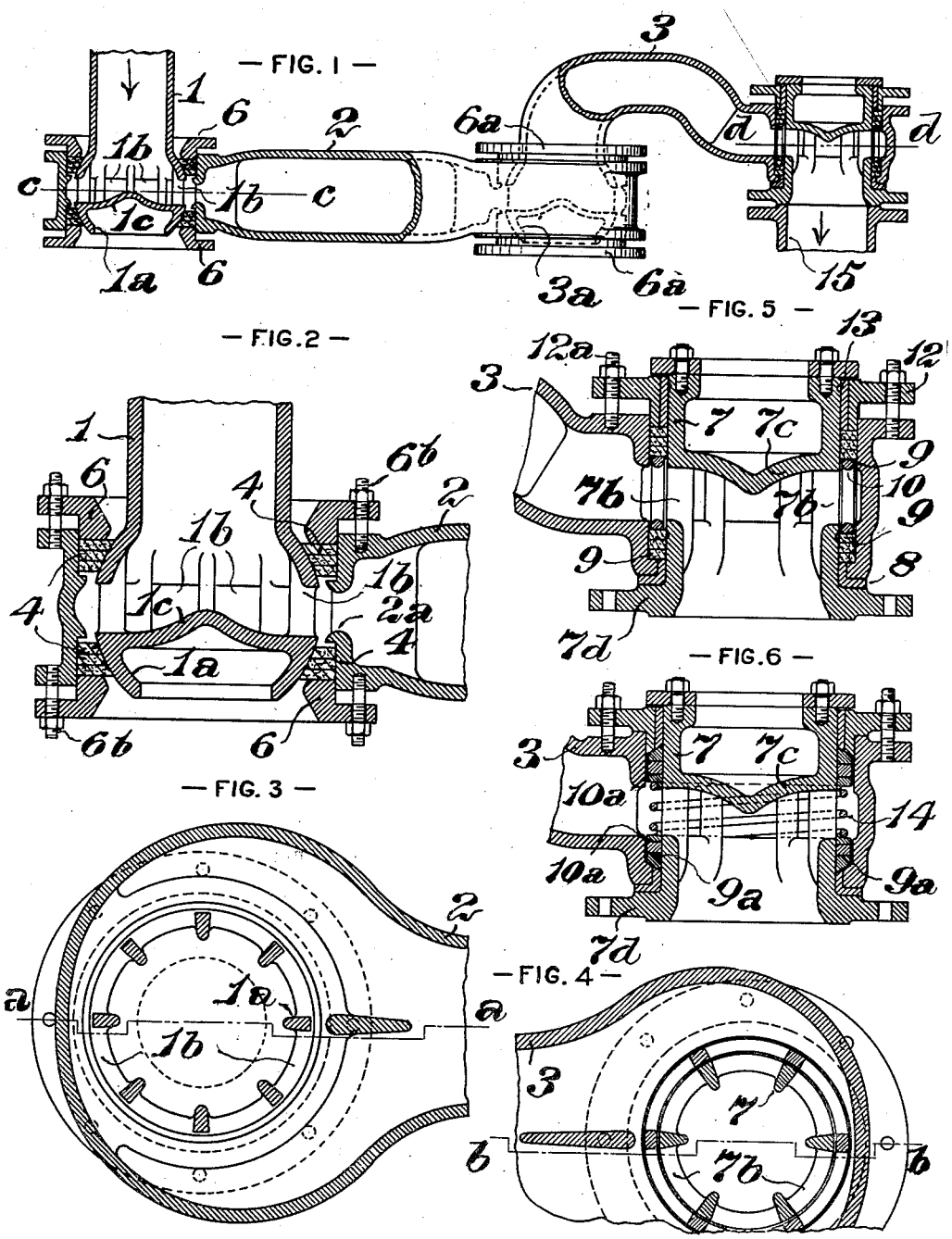

1,838,740

UNITED STATES PATENT OFFICE

HARRY S. BURNHAM, OF SCHENECTADY, NEW YORK

FLUID PRESSURE CONDUIT

Application filed July 28, 1928. Serial No. 295,891.

This invention relates generally to the class or type of appliances known as conduits for the conveyance of fluid under pressure, and particularly to a conduit structure in the operation of which unbalanced pressures will be eliminated, and also, all tendency of the fluid pressure to force the parts out of proper relation and overload the packing.

The improvement claimed is hereinafter fully set forth.

In the accompanying drawings: Figure 1 is a view, partly in elevation and partly in vertical longitudinal section, on the lines $a\,a$ and $b\,b$ of Figs. 3 and 4, of a fluid pressure conduit, illustrating an embodiment of the invention; Fig. 2, a vertical section, on an enlarged scale, on the line $a\,a$ of Fig. 3; Fig. 3, a horizontal section, also on an enlarged scale, on the line $c\,c$ of Fig. 1; Fig. 4, a similar section on the line $d\,d$ of Fig. 1; Fig. 5, a section similar to Fig. 1, on the line $b\,b$ of Fig. 4; and Fig. 6, a section, similarly taken, illustrating a modification of structural detail.

In the practice of the invention, referring descriptively to the specific embodiment thereof which is herein exemplified, the fluid under pressure which passes through the conduit, enters the pipe, 1, which terminates at its lower extremity in a truncated hollow sphere, 1a, having a plurality of outlets, 1b, in its wall, for the outflow of the fluid, spaced around its periphery on its horizontal centre line, and a bottom 1c, which is upwardly tapered, in such manner as to direct the fluid passing downwardly through the pipe, 1, outwardly through the openings, 1b. The longitudinal member, 2, is substantially circular in transverse section, and, at its ends, is widened into circular openings, the axes of which are at right angles to the axis of the body portion of the member, and through which openings the spherical ends of the adjacent members enter.

The spaces between the walls, 2a, which define these circular openings, and the outer surface of the sphere, 1a, at one end, and the sphere, 3a, at the other end, formed on the end of the adjoining conduit member 3, are fitted with packing rings, 4, 4. It will be noted that packing is applied both above and below the horizontal axes of the spheres and the longitudinal member, 2, so that the tightening of either gland, acts to further compress both the upper and lower sets of packing. Any required tightening of the packing can therefore be effected by adjusting the gland which is the more accessible. The glands are secured to the member, 2, by studs, 6b, adjustment of the nuts which are fitted thereon, serving to impose pressure on the packing. For purposes of assembly, the upper gland, 6, will be made in sections, instead of in a single piece. The spherical ends, 1a and 3a, surrounded by packing, compressed to fit their outer surface, form so-called "ball joints", which provide for universal movement, to absorb all lateral displacements and a predetermined and limited amount of vertical displacements. The packing merely serves to seal the joints, against the leakage of fluid, there being no tendency of the parts to be forced apart by the internal pressure of the conducted fluid, and consequently no necessity of the packing resisting such tendency.

The end of the conduit member, 3, opposite the end connected to the member, 2, is, similarly to the ends of the member, 2, formed with a circular opening, at right angles to the axis of the body, but instead of surrounding a ball, as in the case of the opposite end of the member, 2, it surrounds a sleeve, 7, which is connected to the outlet section, 15, of the conduit. Inlets 7b, are formed in the cylindrical wall of the sleeve, 7, and are so located as to permit the fluid under pressure in the member, 3, to enter it, and be downwardly deflected by a transverse wall, 7c, which extends across the sleeve and is downwardly tapered, to the outlet pipe, 15. A flange, 7d, is formed on the lower end of the sleeve, 7, to provide for bolting thereto the outlet member, 15, or another member of the conduit, if it is to be prolonged by connections similar to those hereinbefore described. A ring, 8, of angular cross section, is fitted between the flange, 7d, and the lower face of the member, 3, and between the lower face of the circular opening in the member, 3, and sleeve, 7, to form a bearing for the rotation of the member, 3, around the sleeve, 7, and also to form a bottom for the soft packing rings, 9, which are applied from above and pushed down into place below the inlets, 7b. A spacing ring, 10, having openings to permit the passage of fluid without restriction of area, is located in line with the inlets, 7b. The purpose of the spacing ring is to apply compressive force to the soft packing rings, 9, 9, and to form a bottom for the upper system of these rings which are located above the inlets, 7b. The gland, 12, exerts compression on both sets of soft packing rings, when drawn down by the nuts on the studs, 12a, which connect it to the upper surface of the member, 3. Inasmuch as there is relative rotative movement between the member, 3, and the sleeve, 7, the gland, 12, is lined with a bushing, 13, to absorb the friction of such rotation.

Fig. 6, illustrates a modification of structural detail, in which the metal packing, 9a, is substituted for the soft packing, 9, and two bottom rings, 10a, held apart by a spring, 14, are substituted for the one piece spacing ring. The spring, 14, will impose compressing force on both sets of packing rings, when the gland, 12b, is tightened against the packing above the inlets, 7b, in the wall of the sleeve, 7.

It will be seen that the hinge action or rotary movement in one plane, about the sleeve, 7, at one end, together with the universal movement provided for by the ball joints at the extremities of the conduit member, 2, affords a capacity of universal movement between the ends of the conduit, and, further, that by constructing the end members with peripheral openings for the passage of the fluid transmitted, there can be no tendency of the pressure thereof to separate the joints, and the packing becomes merely a seal against pressure leakage, and is not obliged to resist any separating tendency of the joints.

The invention claimed and desired to be secured by Letters Patent, is:

1. In a fluid pressure conduit, comprising a plurality of members, joined to afford capacity of relative movement, deflecting means, comprising a tapered, transverse wall, disposed on one of the members within a joint of said members, and a plurality of outlets peripherally spaced around said member adjacent said deflecting means, whereby the direction of flow of fluid will be changed within said joint and directed through said outlets so as to prevent the separation of the members by the pressure of the fluid traversing the conduit.

2. In a fluid pressure conduit, comprising a plurality of members, articulated to afford a capacity of relative movement, the combination of a hollow sphere, formed on the end of one of the members, and having peripheral openings, and a tapered transverse deflecting wall, for directing the flow of fluid through said openings; a member having an annular end, spaced from said sphere to form stuffing boxes on opposite sides of said openings; and sets of packing oppositely disposed in said spaces, whereby a balance of pressure is effected upon said sets of packing.

3. In a fluid pressure conduit, comprising a purality of members, articulated to afford capacity of relative movement, the combination of a hollow sphere, formed on the end of one of the members, and having peripheral openings, and a tapered transverse deflecting wall, for directing the flow of fluid through said openings; a member having an annular end spaced from said sphere to form stuffing boxes on opposite sides of said openings; sets of packing oppositely disposed in said spaces whereby a balance of pressure is effected upon said sets of packing; and means whereby the tightening of the packing in one stuffing box also tightens the packing in the opposite stuffing box.

4. A fluid pressure conduit comprising at least three rigid sections, one section having at one of its ends a universal joint articulation with another section and at its opposite end a hinge joint articulation with another section, whereby the sections will be rotatable about one axis only at the hinge joint articulation, and deflecting means within at least one of said joints, comprising a tapered transverse wall and a plurality of outlets peripherally spaced therein adjacent said transverse wall whereby the direction of flow of the fluid from one section will be changed within the joints and directed through said openings to the adjoining section so as to prevent separation of said sections by the pressure of fluid traversing the conduit.

5. A sectional fluid pressure conduit comprising a flexible joint connecting two sections of the conduit, said joint having two members, one of said members having a tapered, transverse, deflecting wall closing one of its ends and a side wall having a plurality of openings adjacent said transverse wall for the passage of fluid, said members being spaced apart to provide oppositely disposed packing-containing spaces on each side of said openings, two sets of packing oppositely disposed in said spaces, whereby a balance of pressure is effected upon said sets of packing and adjustable means for exerting mechanical pressure on said packing.

6. A fluid pressure conduit comprising a plurality of sections articulated to afford relative movement, one of said sections being rigid and hingedly articulated to an adjacent section substantially at right angles thereto for rotation about the axis of said adjacent section, the adjacent section having a tapered, transverse, deflecting wall closing one of its ends, and a plurality of openings peripherally spaced adjacent said transverse wall, the said rigid section having an annular end spaced from said closed end to form stuffing boxes on opposite sides of said openings, a set of packing disposed in each stuffing box, a seat disposed between said sections for one set of packing, means seated on said set of packing forming a seat for the opposite set of packing, and means engaging the said second set of packing to apply pressure to both sets of packing.

7. A fluid pressure conduit comprising a plurality of sections articulated to afford relative movement, one of said sections being rigid and hingedly articulated to an adjacent section for rotation substantially at right angles to said adjacent section, the adjacent section having a tapered, transverse, deflecting wall closing one of its ends, and a plurality of openings peripherally spaced adjacent said transverse wall, the said rigid section having an annular end spaced from said closed end to form stuffing boxes on opposite sides of said openings, a set of packing disposed in each stuffing box, a metal gland disposed between the sections above one set of packing, means seated on the other set of packing and forming a seat for the first set of packing, and a metal flange member formed on said rigid section extending beneath the other set of packing, the said gland and flange being adapted to support said packing and provide a bearing for the said rotating sections.

8. A sectional fluid pressure conduit comprising a flexible joint connecting two sections of said conduit said joint having two members, one of said members having a closed end and a side wall having a plurality of openings adjacent said end, for the passage of fluid, said members being spaced apart to form stuffing boxes on opposite sides of the openings and having walls inwardly converging toward each other in the direction of the openings, two sets of packing oppositely disposed in said stuffing boxes, means disposed on the outside of one set of packing to form a supporting seat for the same and means disposed on the outside of the other set of packing to form a gland for exerting pressure on both sets of packing to effect a wedging action of the same in said converging spaces.

9. A fluid pressure conduit comprising a plurality of members articulated to afford capacity of relative movement, a chamber formed on the end of one of the members having peripheral openings and a tapered transverse deflecting wall for directing the flow of fluid through said openings; and an annular end formed on another member spaced from said chamber to form stuffing boxes on opposite sides of said openings; and sets of packing oppositely disposed in said stuffing boxes, whereby a balance of pressure is effected upon said sets of packing.

10. A fluid pressure conduit comprising a plurality of members articulated to afford capacity of relative movement, a chamber formed on the end of one of the members, having peripheral openings and a tapered transverse deflecting wall for directing the flow of fluid through said openings; an annular end formed on another member spaced from said chamber to form stuffing boxes on opposite sides of said openings; sets of packing oppositely disposed in said stuffing boxes whereby a balance of pressure is effected upon said sets of packing; and means adjustable for tightening the packing in one stuffing box, said means being adapted simultaneously with said adjustment to tighten the packing in the opposite stuffing box.

11. A fluid pressure conduit comprising a plurality of members articulated to afford capacity of relative movement, one of said members having a plurality of peripheral openings at an end thereof; a tapered transverse deflecting wall adjacent said openings, closing said end of the member, for directing the flow of fluid through said openings; an annular end formed on an adjacent member spaced from said first member and forming stuffing boxes on opposite sides of said openings; sets of packing disposed in said stuffing boxes; a packing spacing ring disposed between said sets of packing and having openings permitting the passage of fluid therethrough, said ring being adapted upon the tightening of the packing in one stuffing box to coincidently effect a tightening of the packing in the opposite stuffing box.

12. A fluid pressure conduit comprising a plurality of members articulated to afford capacity of relative movement, one of said members having a plurality of peripheral openings at an end thereof; a tapered transverse deflecting wall adjacent said openings, closing said end of the member for directing the flow of fluid through said openings; an annular end formed on an adjacent member spaced from said first member and forming stuffing boxes on opposite sides of said openings; sets of packing disposed in said stuffing boxes; and a spring disposed between the said sets of packing acting against the inner ends thereof, and affording an automatic adjustment of both said sets of packing.

13. In a fluid pressure conduit, comprising a plurality of members, joined to afford capacity of relative movement, the combination of a hollow cylinder formed on an end of one of the members, and having peripheral openings and a tapered, transverse deflecting wall adjacent said openings; and an annular end formed on another of said members, surrounding said cylindrical end, whereby the direction of flow of fluid from one section will be changed within the joint and directed to the adjoining section, so as to prevent separation of said sections by the pressure of fluid traversing the conduit.

14. In a fluid pressure conduit, comprising a plurality of members, joined to afford capacity of relative movement, the combination of a hollow cylinder on an end of one of the members, having peripheral openings, and a tapered, transverse deflecting wall for directing the flow of fluid through said openings; a member having an annular end surrounding said cylinder, to form stuffing boxes on opposite sides of said openings; sets of packing oppositely disposed in said stuffing boxes whereby a balance of pressure is exerted upon said sets of packing; and means whereby the tightening of the packing in one stuffing box also tightens the packing in the opposite stuffing box.

HARRY S. BURNHAM.